March 24, 1959 E. W. FRANCK ET AL 2,879,176

METHOD OF APPLYING A MAGNETIC SOUND TRACK STRIPE TO A FILM

Filed Dec. 9, 1950 2 Sheets-Sheet 1

INVENTORS.
ERNEST W. FRANCK AND
STEPHEN A. SCHETTINI
BY
ATTORNEY

METHOD OF APPLYING A MAGNETIC SOUND TRACK STRIPE TO A FILM

Filed Dec. 9, 1950 2 Sheets-Sheet 2

INVENTORS.
ERNEST W. FRANCK AND
STEPHEN A. SCHETTINI
BY John J. Hanrahan
ATTORNEY United States Patent Office 2,879,176
Patented Mar. 24, 1959

2,879,176

METHOD OF APPLYING A MAGNETIC SOUND TRACK STRIPE TO A FILM

Ernest W. Franck and Stephen A. Schettini, Stamford, Conn., assignors to Reeves Soundcraft Corporation, Danbury, Conn., a corporation of New York Application December 9, 1950, Serial No. 200,036

4 Claims. (Cl. 117—44)

This invention relates to new and useful improvements in motion picture film and has particular relation to a motion picture film having a magnetic sound track thereon and to a method of applying such sound track to the film.

An object of the invention is to provide an improved motion picture film having a magnetic sound track thereon.

Another object is to provide a new method of applying a magnetic sound track to a motion picture film.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

Figure 1:
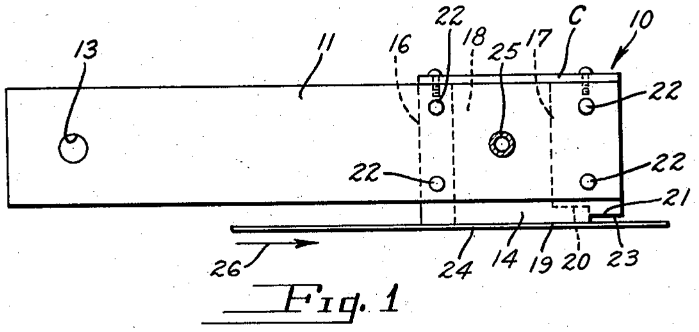
Fig. 1 is a side elevational view illustrating the application of a sound track to a motion picture film.
Figure 3:
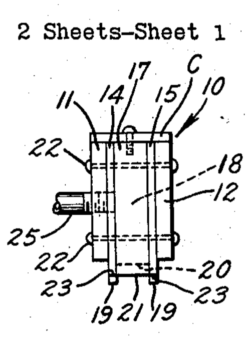
Fig. 3 is a rear elevational view of the applicator.
Figure 2:
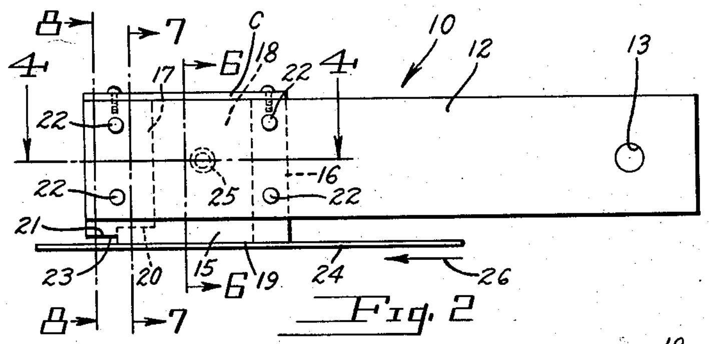
Fig. 2 is a similar view but showing the opposite side of the applicator.
Figure 4:
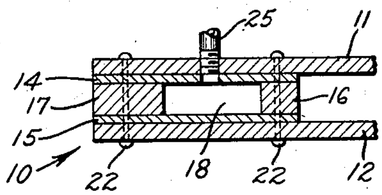
Fig. 4 is a horizontal sectional view taken along the plane of the line 4—4 of Fig. 2.
Figure 5:
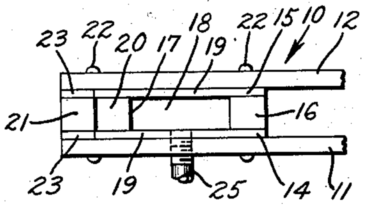
Fig. 5 is a bottom plan view of the applicator.
Figure 6:
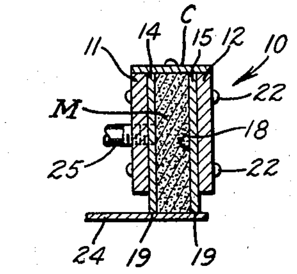
Figure 7:
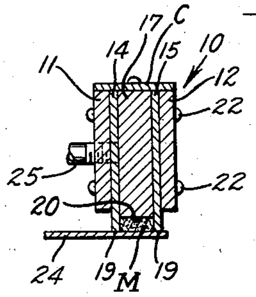
Figure 8:
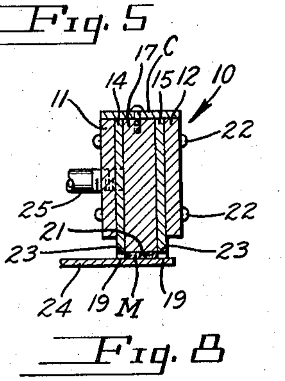
Figure 9:
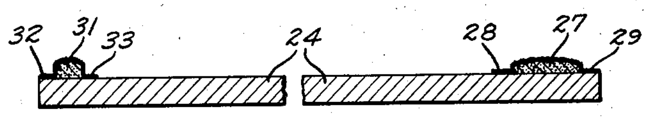
Figure 10:
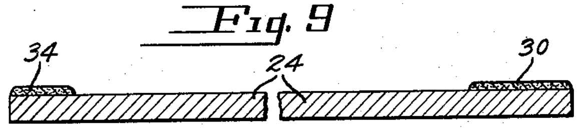
Figure 11:
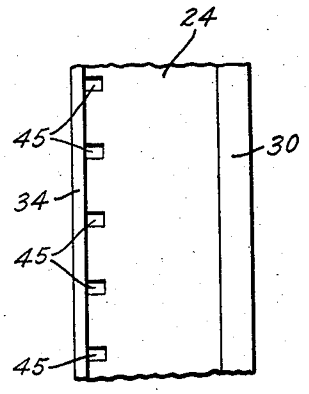
Figure 12:
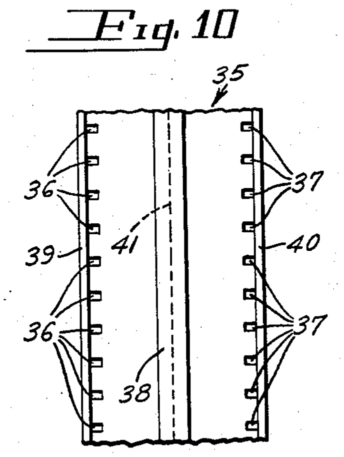
Figure 13:
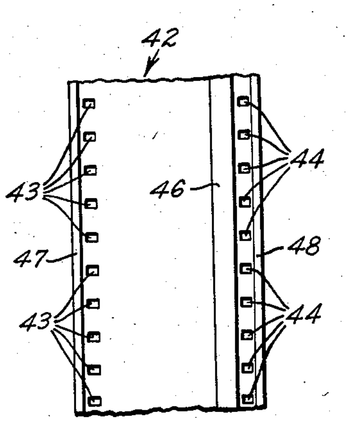
Figure 14:
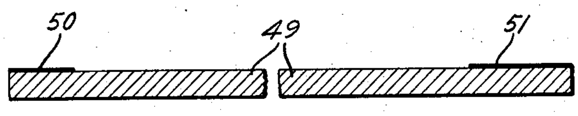
Figure 15:
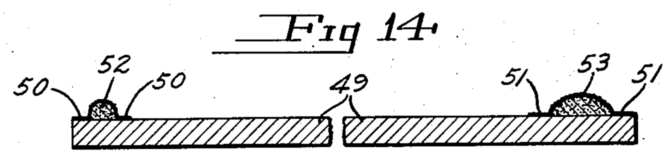
Figure 16:
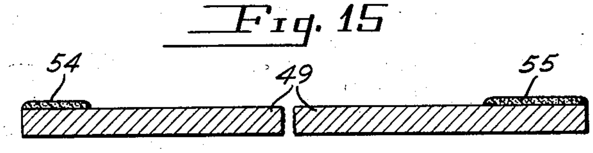

Figs. 6, 7 and 8 are vertical transverse sectional views taken along the planes of the lines 6—6, 7—7 and 8—8, respectively, of Fig. 2;

Fig. 9 is a greatly enlarged transverse sectional view through a film in the process of having a sound track applied thereto in accordance with the invention;

Fig. 10 is a similar view but of the complete film;

Fig. 11 is a plan view of a section of the complete film;

Fig. 12 is a similar view of a modification;

Fig. 13 is a similar view showing another modification;

Fig. 14 is a greatly enlarged transverse sectional view through a film and illustrating a step in a modification of the method of applying the magnetic sound track thereto;

Fig. 15 is a similar view illustrating another step in the practise of the modified method; and Fig. 16 is a similar view of the completed film.

At present, the most urgent need is for a better sound track on 16 mm. film. On such a size of film, the provision of a photographic sound track frequently gives a very unsatisfactory reproduction. According to the present invention, a film is provided with a magnetic track and while the immediate intention is for the application of such sound track to a 16 mm. film, it is to be understood that the invention is applicable to 35 mm. film and may, in fact, be employed with or incorporated in any size of film.

In practising the method of the present invention, a stripe having magnetic properties or of magnetizable material is applied to the film. This stripe is of uniform thickness and width and has straight or at least substantially straight edges. The stripe comprises a dried or set or cured mixture of a suitable magnetic material and a binder. The magnetic material may be iron oxide or the like in a pulverous state dispersed through the binder. While the magnetic material is herein referred to as in a pulverous state, by this it is intended to describe the condition of the material. The material used is very finely divided or in particle size of extreme fineness, although the precise fineness is not critical and is not herein defined.

At the time of its application, the mixture is paint-like or paste-like. Thus there is a permissible range as to viscosities in the mixture of magnetic material and binder. At present, it is preferred that the mixture is not watery but is of a heavy consistency to have only a slight tendency to flow of its own volition, but which yet may be caused to flow or spread to a limited extent.

Referring in detail to the drawings, at 10 is generally indicated an applicator by means of which the magnetic stripe or sound track is to be applied to the film. As here disclosed, this applicator comprises a pair of relatively heavy, rigid elongated mounting plates 11 and 12 located in aligned parallel relation. At their forward ends, these plates are provided with registering openings 13 for the passage of a pin or bolt or other mounting or securing means.

Located between the rear end portions of the mounting plates 11 and 12 are a pair of thin plates 14 and 15. Plates 14 and 15 are arranged in spaced parallel relation and between the forward ends of such plates is a front end wall member 16 and between the rear portions of said plates is a rear end wall member 17. For purposes of disclosure, rear wall member 17 is shown as of approximately twice the thickness of front wall member 16. These end wall members are shown as of bar-like construction and of the same width to locate the plates 14 and 15 and the mounting plates 11 and 12 in spaced parallel relation. Between the side wall plates 14 and 15 and the end members 16 and 17 there is defined a chamber or receptacle 18 closed at its upper end by a cover C.

The plates 14 and 15 extend below the lower edges of the mounting plates 11 and 12 and have their lower edges 19 flush with the lower end of the front wall member 16 and below the lower end of the rear wall member 17. Rear wall member 17 is in a stepped construction at its lower end having lower end surfaces 20 and 21 of which the former is the innermost, is at the rear of chamber 18 and is in a plane above that of surface 21. Rivets 22 pass through the supporting plates 11 and 12, the side wall plates 14 and 15 of the chamber or receptacle, and the end wall members 16 and 17 of said receptacle, securing all of these parts in the above described relation.

The lower edges 19 of the side wall plates 14 and 15 are aligned with and parallel with one another. These side wall plates are very thin, being of a thickness of only .006 inch and preferably thinner, depending on the material from which they are fabricated. Preferably, they are of copper or brass and they are strengthened and held in place against distortion or bulging since for the far greater portion of their areas they are against the heavier mounting plates 11 and 12 and only their lower edge portions are exposed below said mounting plates. The rear lower corners of the plates 14 and 15 are cut away providing shoulders 23 flush with the lower surface portion 21 of the rear end wall member 17. The purpose of this construction will appear.

In practising the method of the invention, a film 24 and the applicator 10 are so related that the lower edges 19 of the side wall plates 14 and 15 of the applicator are against one side of the film and preferably at or very closely adjacent a longitudinal edge thereof. In the case of a 16 mm. film, the lower edges of the side wall plates 14 and 15 would be engaging the film at its imperforate edge or its edge remote from that adjacent which the sprocket perforations are located.

Now the mixture M to form the magnetic track is fed, from a receptacle (not shown) located about one foot above the elevation of the applicator, into the chamber 18 as through a connection 25 in a side wall thereof. The pastelike mixture moves downwardly in the chamber and out through the open lower end thereof and onto the film 24. At this time, relative movement is taking place between the applicator and the film in the direction of the length of the latter. As suggested in the drawing, this relative movement is accomplished by permitting the applicator to remain stationary and moving the film in the direction of the arrows 26.

As the described relative movement between the film and applicator takes place, the mixture having magnetic properties is deposited on the film, as shown at 27 in Fig. 9. Actually, the height of the material bearing on the film is the height of the material within the chamber or receptacle 18. In addition, the binder employed in the mixture wets the inner surfaces of the side wall plates 14 and 15 and carries under the lower edges of said plates and serves to wet narrow paths 28 and 29 (Fig. 9) extending longitudinally of the film and at the edges of the deposited mixture 27. These paths 28 and 29 are of a width equal to the thickness of the stock forming the side wall plates 14 and 15 of the applicator and are immediately at the sides of the deposited material and are straight with uniform edges.

As the relative movement of the applicator and film continues in the direction of the length of the latter, the film having a deposit 27 thereon moves under the rear wall member 17 of the chamber or receptacle and the inner or forward step 20 of this member levels off the mixture acting somewhat as a doctor blade and leaving the material much as illustrated at 27 in Fig. 9. Then as the deposited stripe of the mixture comes under the step 21 of the rear wall member 17 and opposite the cut-away edge portions 23 at the rear lower corners of the wall plates 14 and 15, the mixture is spread laterally.

The mixture is spread by the surface 21 and the surfaces of shoulders 23 substantially to the desired width but its final movements may be of its own accord. It easily flows laterally out over the wetted paths 28 and 29 until it forms a stripe of uniform thickness covering the film from the outer edge of the path 28 to the outer edge of the path 29. This completed stripe resulting from the lateral flowing of the coating mixture is indicated at 30 in Figs. 10 and 11 and as of the width desired, of uniform thickness and has straight edge portions although slightly radiused at its corners. The radiused corners will not too easily chip or break off. The deposited track of magnetic material is dried in place. The film may then be used in making pictures for projection and sound may be recorded in the magnetic sound track 30.

In order that the film may be coiled into a flat sided roll of substantially equal diameter along each of its sides and avoid the formation of a cone by building up on one another of the layers of magnetic sound tracks 30, a means similar to the applicator 10, but having a discharge of less width and having a spreader portion of less width, is employed. Such means will deposit a stripe 31 (Fig. 9) on an edge of the film outwardly of the sprocket perforations thereof and at the same time form wetted paths 32 and 33 along each side of the deposited coating mixture.

Then as the deposited coating mixture is carried beneath the latter portion or the doctor blade portion of the applicator, the coating mixture is spread and flows or is caused to flow laterally over the wetted paths covering the same and forming a stripe 34 (Fig. 10) which is relatively narrow and only occupies the space between the sprocket perforations and the adjacent longitudinal edge of the film. However, stripe 34 is of uniform thickness and of the thickness of the stripe 30 and because of the method employed in forming stripe 34, it also has straight sides although radiused or having rounded corners at the junction of its side and top walls.

Fig. 12 suggests a slightly different method of forming the film 24. In Fig. 12, a relatively wide piece of film 35 is employed and is provided with rows of sprocket perforations 36 and 37 adjacent its respective longitudinal edge. A relatively wide stripe 38 of a magnetic composition is deposited along the longitudinal center of film 35 by means similar to that previously described and according to the method herein disclosed. Such stripe 38 is of uniform thickness and width with straight edges although radiused at the junction of its top and side walls.

Additionally, narrow stripes of the magnetic mixture are deposited along the longitudinal edges of film 35 outwardly of the sprocket perforations thereof as at 39 and 40. After the deposited material is dried or set or cured, film 35 is split along its longitudinal center line as indicated by the broken line 41, whereby two films are formed, each corresponding in structure with the film 24 above described. That is, the stripes 39 and 40 of the split portions of film 35 are the equivalent of the stripe 34 of film 24 while the divided portions of the stripe 38 are each the equivalent of the stripe 30 of film 24.

In Fig. 13 a film 42 is shown having rows of sprocket perforations 43 and 44 along its respective longitudinal edges. Comparing Figs. 11, 12 and 13, it will be noted that film 24 having only one row of sprocket perforations 45 is of the structure commonly employed in 16 mm. motion picture film. Film 42 is of the structure commonly employed in 35 mm. film. Thus, it will be understood that the invention is applicable to any film.

By the method of the invention, a strip 46 of a mixture containing magnetic material in sufficient quantities for the formation of a magnetizable stripe is deposited on the film 42 immediately inwardly of sprocket perforations 44. This stripe 46 corresponds in purpose and structure with the stripe 30 of film 24 and the stripe formed by splitting the stripe 38 of the film 35. Additionally, stripes 47 and 48 of a magnetizable mixture are deposited on film 42 at the outer sides of the rows of sprocket perforations 43 and 44.

Stripes 47 and 48 insure that the film 42 may be rolled into a flat sided roll. They are of equal thickness and of the thickness of stripe 46 and all of these stripes are formed in the manner described when considering films 24 and 35. Additionally, stripes 46, 47 and 48 are of the structure of the stripes previously described. The three stripes on the film not only provide for balance in winding of the film to avoid a cone formation but also provide for the obtaining of stereophonic sound to follow across a screen with a picture when the latter is projected. Two such stripes probably would not give the stereophonic effect. In each of the films shown there are at least two stripes of material suitable for use as a magnetizable sound track, one such stripe being to the right and the other to the left of the longitudinal center of the film. This insures of balance in winding of the film into a roll or reel, avoiding the formation of a cone.

Figs. 14, 15 and 16 serve to illustrate another method of making any of the films disclosed, i. e., they illustrate a modification of the method of applying the stripes of a magnetizable mixture to films. According to the modified method, a film 49 (Fig. 14) is wetted in stripes 50 and 51 which wetted stripes are located or positioned on the film as are the stripes 34 and 30 of film 24. Then stripes 52 and 53 (Fig. 15) of a magnetizable mixture containing magnetic material and a binder, are deposited in any suitable manner along the approximate centers of the wetted stripes 50 and 51.

Thereafter, by a process of spreading or flowing on their own account or because of their own properties, stripes 52 and 53 spread over the wetted stripes 50 and 51, respectively, forming stripes 54 and 55 (Fig. 16). These latter stripes are dried or cured in place on the film and constitute the finished product. They are formed with flat upper surfaces and straight sides and are of uniform width and thickness. The finished stripes are of the widths of the wetted stripes 50 and 51. Thus, it will be seen that the stripes of magnetic mixture may be applied to films, for example, films 24, 35 and 42, by either the method first set forth or by the method illustrated in Figs. 14–16. The stripes may be applied to a photosensitive film before or after exposure and development of the latter and, if before, the coating will take place in the absence of light.

Having thus set forth the nature of our invention, what we claim is:

1. The method of applying to a film a magnetic sound track in the form of a stripe of less width than the width of the film and having substantially straight edges, comprising flowing onto said film a narrow stripe of a dispersion consisting of solid magnetizable particles suspended in a liquid binder capable of wetting said film and simultaneously therewith wetting the film surface along each side of the stripe with said binder in continuous areas along each side of the stripe having substantially straight outside edges which define the final stripe width, and covering said wetted areas by lateral movement of said dispersion to said outside edges of said areas.

2. The method set forth in claim 1 which includes the step of drying the stripe on the film.

3. The method of applying to a film a magnetic sound track in the form of a stripe of less width than the width of the film and having substantially straight edges, comprising wetting continuous straight edged areas extending longitudinally of said film and of less width than the width of the film with a liquid binder for solid magnetizable particles, flowing a dispersion consisting of solid magnetizable particles suspended in a liquid binder onto said film, and spreading said dispersion laterally toward the outside edges of said wetted areas which define the final width of the stripe.

4. The method set forth in claim 3 which includes the step of drying the stripe on the film.

References Cited in the file of this patent

UNITED STATES PATENTS

| | | |
|---|---|---|
| Re. 10,462 | Buchanan | Apr. 1, 1884 |
| 1,308,098 | Neben | July 1, 1919 |
| 1,321,421 | Delany | Nov. 11, 1919 |
| 1,466,750 | Peterson | Sept. 4, 1923 |
| 1,558,271 | Newell | Oct. 20, 1925 |
| 1,653,467 | O'Neill | Dec. 20, 1927 |
| 1,883,559 | Chipman | Oct. 18, 1932 |
| 1,883,562 | Chipman et al. | Oct. 18, 1932 |
| 2,152,012 | Albion | Mar. 28, 1939 |
| 2,159,704 | Levey | May 23, 1939 |
| 2,479,868 | Rossmann et al. | Aug. 23, 1949 |
| 2,479,869 | Rossmann et al. | Aug. 23, 1949 |
| 2,480,162 | Rath | Aug. 30, 1949 |
| 2,536,029 | Camras | Jan. 2, 1951 |
| 2,541,136 | Warren | Feb. 13, 1951 |

FOREIGN PATENTS

| | | |
|---|---|---|
| 324,099 | Great Britain | Jan. 17, 1930 |
| 333,154 | Great Britain | Aug. 5, 1930 |
| 340,705 | Great Britain | Jan. 8, 1931 |